April 3, 1956   J. D. DILLARD   2,740,439
HAND OPERATED RECIPROCATING PISTON TYPE NUT CRACKER
Filed May 29, 1953   2 Sheets-Sheet 1
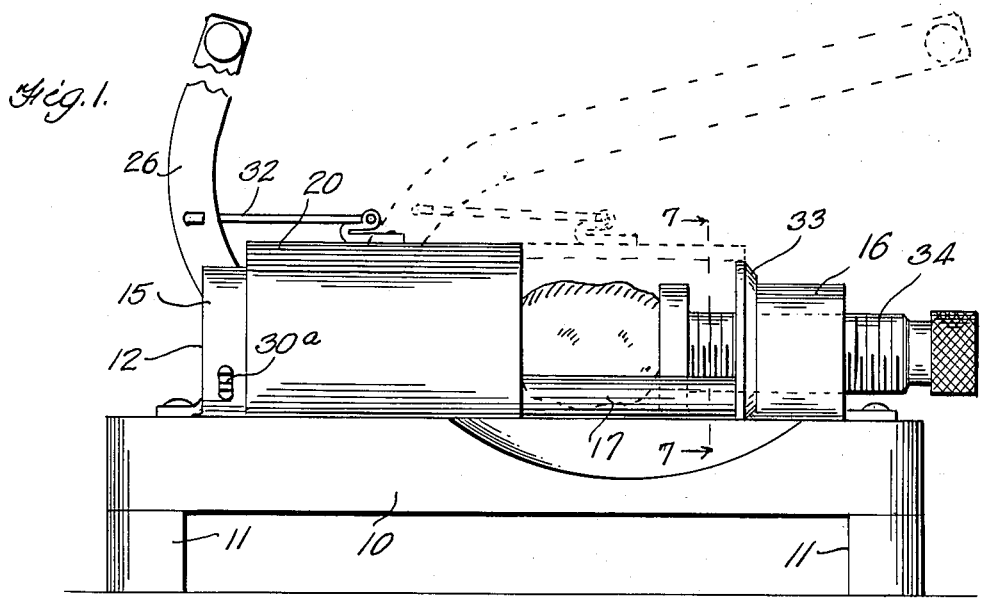
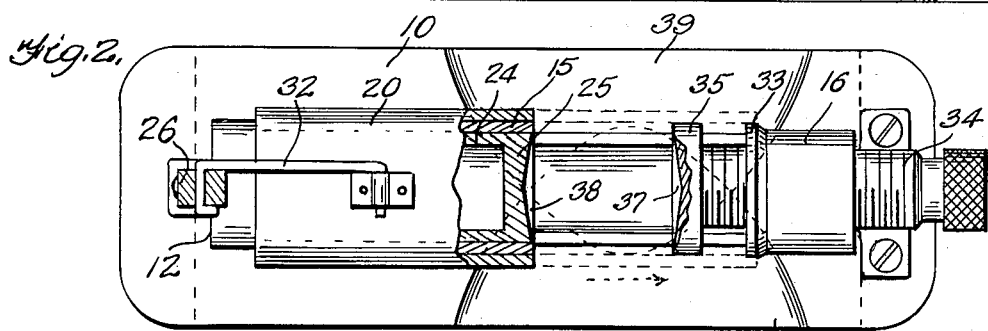
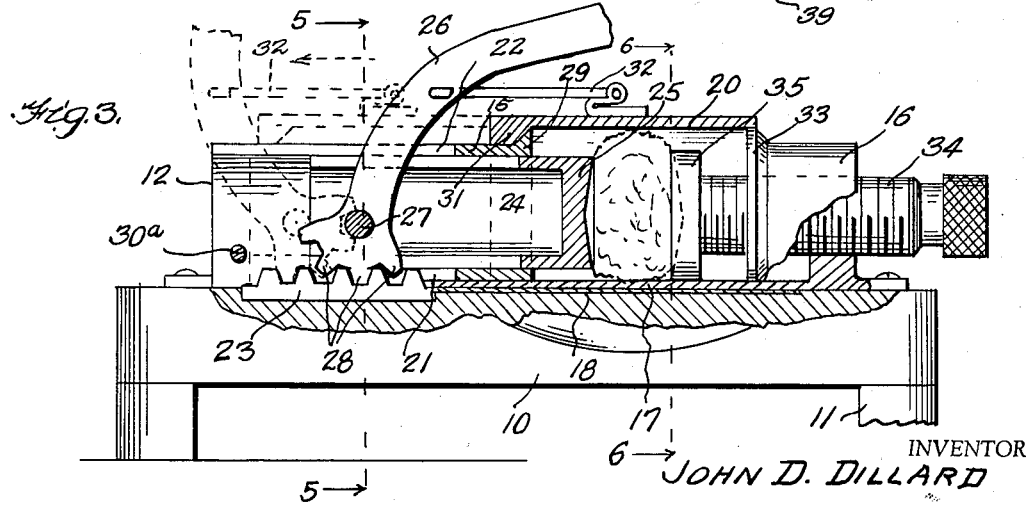
INVENTOR
JOHN D. DILLARD
BY
HIS ATTORNEY April 3, 1956   J. D. DILLARD   2,740,439
HAND OPERATED RECIPROCATING PISTON TYPE NUT CRACKER
Filed May 29, 1953   2 Sheets-Sheet 2
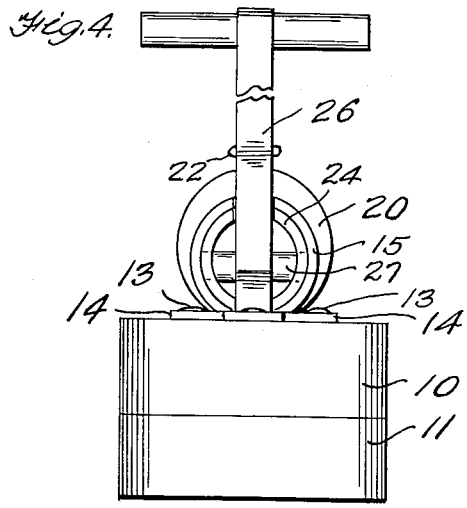
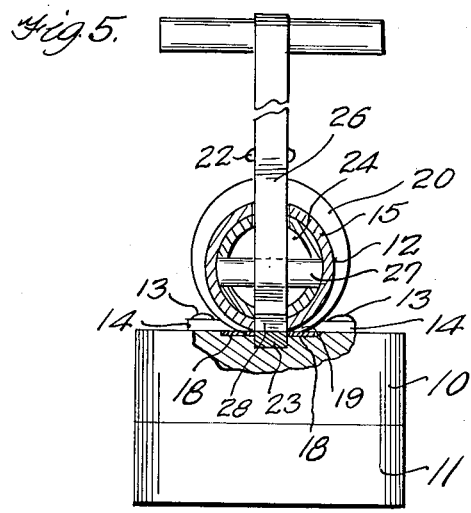
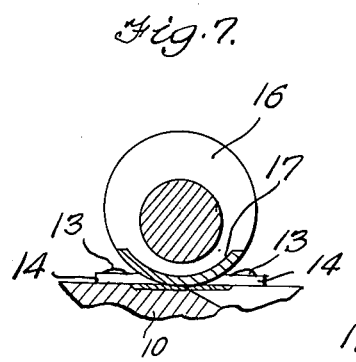
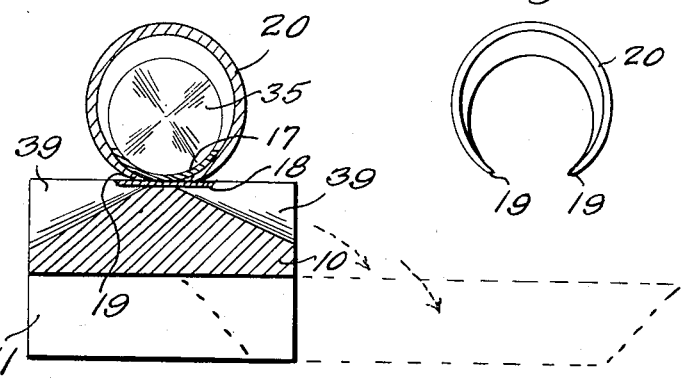
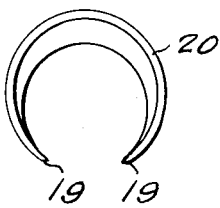
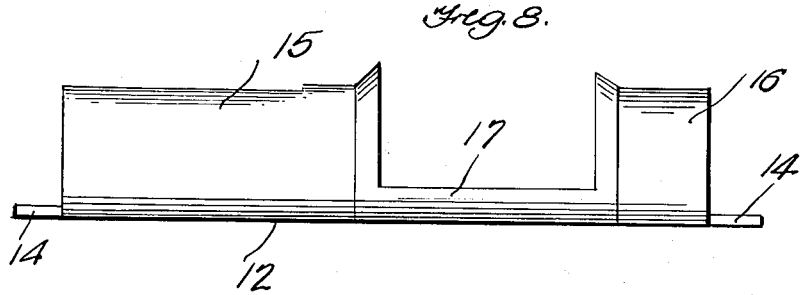
INVENTOR
JOHN D. DILLARD
BY
HIS ATTORNEY

United States Patent Office 2,740,439
Patented Apr. 3, 1956

2,740,439

HAND OPERATED RECIPROCATING PISTON TYPE NUT CRACKER

John D. Dillard, Little Rock, Ark.

Application May 29, 1953, Serial No. 358,493

4 Claims. (Cl. 146—16)

This invention relates to nut crackers, and has for one of its objects the production of a simple and efficient means for quickly and completely cracking nuts within a shielded compartment so that particles of shells etc., will be prevented from falling or flying from the cracker while a nut is being cracked.

A further object of this invention is the production of a simple and efficient nut cracker which is so constructed as to facilitate the depositing of cracked nuts from the cracker into a container or receptacle placed below or adjacent the cracker.

Other objects and advantages of the present invention will appear throughout the following specification and claims.

In the drawings:

Figure 1 is a side elevational view of the nut cracker in an open position;

Figure 2 is a top plan view thereof, certain parts being shown in horizontal section;

Figure 3 is a central longitudinal sectional view of the cracker in a closed or nut-cracking position, certain parts being shown in elevation;

Figure 4 is a rear elevational view of the nut cracker;

Figure 5 is a transverse sectional view taken on line 5—5 of Figure 3, the actuating lever being shown in an operative position;

Figure 6 is a sectional view taken on line 6—6 of Figure 3;

Figure 7 is a fragmentary sectional view taken on line 7—7 of Figure 1;

Figure 8 is a side elevational view of the main casing;

Figure 9 is an end elevational view of the longitudinally movable shielding split cylinder looking from the outer toward the inner end thereof.

By referring to the drawings in detail, it will be seen that 10 designates a base which preferably is supported upon spaced end cleats 11. A main casing 12 is secured to the base by means of suitable screws 13 which pass through the ears 14 of the casing 12. The main casing 12 comprises a longitudinal centrally located cylinder 15 at one end and a screw-receiving journal 16 at its other end. The cylinder 15 and the journal 16 are carried by the base 10, and are connected by an integral nut-supporting bridge portion 17 which is concavo-convex in cross section as is shown in Figures 6 and 7.

A bearing plate 18 preferably extends under the main casing 12 for a major portion of its length to provide a trackway for the lower edges 19 of the shielding split cylinder or sleeve 20. This bearing plate 18 preferably is lubricated to permit the cylinder 20 to freely slide longitudinally of the main casing 12. The cylinder 15 of the casing 12 is provided with a bottom longitudinal slot 21 and a top longitudinal slot 22, these slots being in vertical alignment. A rack bar 23 is secured to the base 10 and the rack teeth thereof extend vertically of the slot 21 and longitudinally of the slot 21. A hollow piston member 24 having a crusher head 25 is slidably mounted within the cylinder 15. An actuating lever 26 is journalled upon a pin 27 which extends transversely of the piston member 24 and is secured to the wall of the piston or crusher member as shown in Figure 5. The lever 26 is provided with depending radiating gear teeth 28 which mesh with the teeth of the rack bar 23, as shown in Figure 3. It should be noted that as the lever 26 is swung forwardly the gear teeth 28 will engage the rack 23 and move the piston forwardly to a nut-crushing or cracking position, or from the dotted line position shown in Figure 3 to the full line position thereof. The cylinder 15 is provided with an eccentric bevelled abutment flange 29 at its outer end.

A longitudinally slidable or movable shielding split cylinder 20 constituting an encasing element is mounted upon the cylinder 15. This cylinder 20 is provided with a bevelled abutment 31 at its rear end for contact with the abutment flange 29 of the cylinder 15 to limit the longitudinal movement thereof. The transverse area of the cylinder 20 extends eccentrically of the cylinder 15 to define the relatively narrow lower edges 19 which ride upon the bearing plate 18, as shown in Figure 5. The cylinder or sleeve 20 is connected to the actuating lever 26 by means of a link 32. Consequently, as the lever 26 is swung forwardly, the teeth 28 by engaging the rack 23 will move the piston 24 forwardly, and at the same time move the sleeve or cylinder 20 to a forward or closing position, as shown in Figure 3. A cotter pin 30a is carried by the rear end of the cylinder 15 to limit the rearward movement of the piston 24.

The journal 16 is provided with an eccentric flange 33 over which the forward end of the sleeve or cylinder 20 is adapted to fit to close the area between the journal 16 and the cylinder 15, when the sleeve or cylinder 20 is in a closed position. A threaded shank 34 is carried by the journal 16 and carries an abutment crusher head 35 at its inner end and a knurled knob 36 at its outer end. The head 35 is preferably dished or concave, as at 37, on its inner face to conveniently receive the end of a nut and the crusher head 25 is likewise dished or concave, as at 38.

The base 10 upon its upper face, and upon opposite sides of the casing 12, is provided with a downwardly inclined dished out portion 39 laterally of the casing 12 to facilitate the direction of crushed nuts into a receptacle such as a receptacle R shown in dotted lines. Such a receptable may be placed under each dished out portion. As shown in Figure 6, the lower edges 19 of the cylinder or sleeve 20 slide under the bridge portion 17 when the sleeve is in a closing or shielding position, to maintain proper alignment and to prevent displacement of the sleeve or cylinder 20.

The operation of the nut cracker is as follows:

A nut is placed upon the bridge portion 17 intermediate the crusher heads 25 and 35. The shank 34 is rotated to adjust the position of the head 35. The lever 26 is then swung from the position shown in dotted lines to the full line position shown in Figure 3. The plunger 24 is thereby moved forwardly toward the head 35 and the sleeve or cylinder is also moved to an enclosing position to enclose the space between the cylinder 15 and the journal 16. The nut will be cracked or the shell crushed between the heads 25 and 35 and within the sleeve or casing 20, since the sleeve or cylinder 30 completely encloses the crushing area between the heads 25 and 35. Because of this arrangement, the crushed or cracked nut will remain upon the bridge portion 17 within the sleeve or cylinder 30 until the lever 26 is swung backwardly to retract the piston 24 and sleeve 20 to an open position. The cracked nut may then be brushed by the hand of an operator into one of the dished out portions 39 and then into a suitable receptacle R which may be placed under the base 10 below one of the concave portions 39 between the clears 11.

By means of this device, nuts may be quickly and efficiently cracked without the possibility of the shells, etc., flying or falling out of the cracker since during the process of cracking the nut will be completely encased within the sleeve or cylinder 20 which is in a closed position. Then by moving the lever 26 rearwardly the sleeve or cylinder 20 and the piston 24 will be moved to the open position. The cracked nut may then be easily and efficiently brushed out of the cracker into a suitable receptacle.

It should be understood that certain detail changes in the mechanical structure may be employed without departing from the spirit of the invention, so long as such changes fall within the scope of the appended claims.

Having described the invention, what is claimed is:

1. A hand operated nut cracker comprising a fixed casing having a cylinder at one end and a bearing spaced from said cylinder at its other end, thereby defining a nut-receiving area, a base supporting said casing, a crusher piston slidable in said cylinder, an abutment crusher means adjustable in said bearing, an encasing sleeve slidably mounted on said cylinder, a rack secured to said base, a hand operated actuating lever fulcrumed upon said crusher piston, said casing having a longitudinal slot, said lever having depending radiating teeth meshing with said rack and adapted to move said piston toward and away from said abutment crusher means as the lever is selectively swung in a forward and a backward direction, said lever extending upwardly through said slot, said slot constituting a guide for said lever, and a link connecting said sleeve to said lever for simultaneously moving the sleeve to and from a nut-receiving area enclosing position as said crusher piston is moved to and from a crushing position.

2. A hand operated nut cracker comprising a base, a longitudinally extending centrally located casing fixed to said base, a crusher piston slidable in said casing, an abutment crusher means carried in spaced relation to said casing upon said base, said base having downwardly inclined dished out portions upon opposite sides of and laterally of said casing to facilitate the direction of discharge of crushed nuts laterally away from said base, an actuating lever fulcrumed on said crusher piston, a rack fixed to said base, gear teeth carried by said lever and engaging said rack for moving said piston to and from said abutment crusher means as said lever is swung, means for laterally bracing said lever as the lever is swung, a sleeve slidable relative to said casing, and means connecting said sleeve to said lever to move the sleeve to a nut enclosing position when swung in one direction and while a nut is being cracked and to move said sleeve to a nut exposing position when the lever is swung to a releasing position so that the cracked nut may be moved laterally and away from the base through said downwardly inclined dished out portions.

3. A hand operated nut cracker comprising a base, a longitudinally extending fixed casing carried by said base, an abutment crusher means carried in spaced relation to said casing, a crusher piston slidable in said casing, a rack fixed to said base, an actuating lever fulcrumed upon said crusher piston, a rack carried by said base, a gear carried by said lever and meshing with said rack for reciprocating said piston within said casing as said lever is swung, said casing having a longitudinal slot, said lever extending upwardly through said slot to facilitate the swinging of said lever and the lateral bracing of said lever, a sleeve slidable upon said casing, a link connecting said sleeve to said lever to move the sleeve over a nut being cracked between the abutment and said crusher piston when the lever is swung in one direction and to uncover the nut when the lever is swung in the opposite direction.

4. A hand operated nut cracker as defined in claim 3 wherein a fixed nut supporting bridge is carried by said base, said sleeve being split and having edges fitting under said bridge to guide said sleeve in its sliding movement upon said base and to hold the sleeve against detachment from said base.

References Cited in the file of this patent

UNITED STATES PATENTS

| | | |
|---|---|---|
| 1,273,974 | Woodson | July 30, 1918 |
| 1,388,071 | Simons | Aug. 16, 1921 |
| 2,085,262 | LaFerney | June 29, 1937 |